E. NALL AND W. B. HARSEL.
E. A. NALL, EXECUTRIX OF E. NALL, DEC'D.
TIRE MAKING MACHINE.
APPLICATION FILED SEPT. 25, 1918.
1,395,055.
Patented Oct. 25, 1921.
3 SHEETS—SHEET 1.
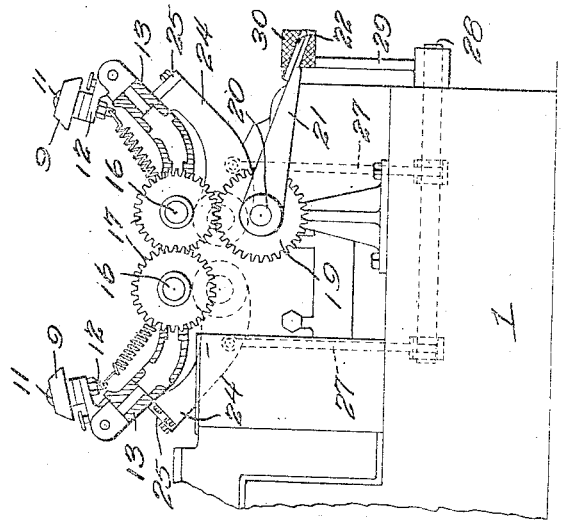
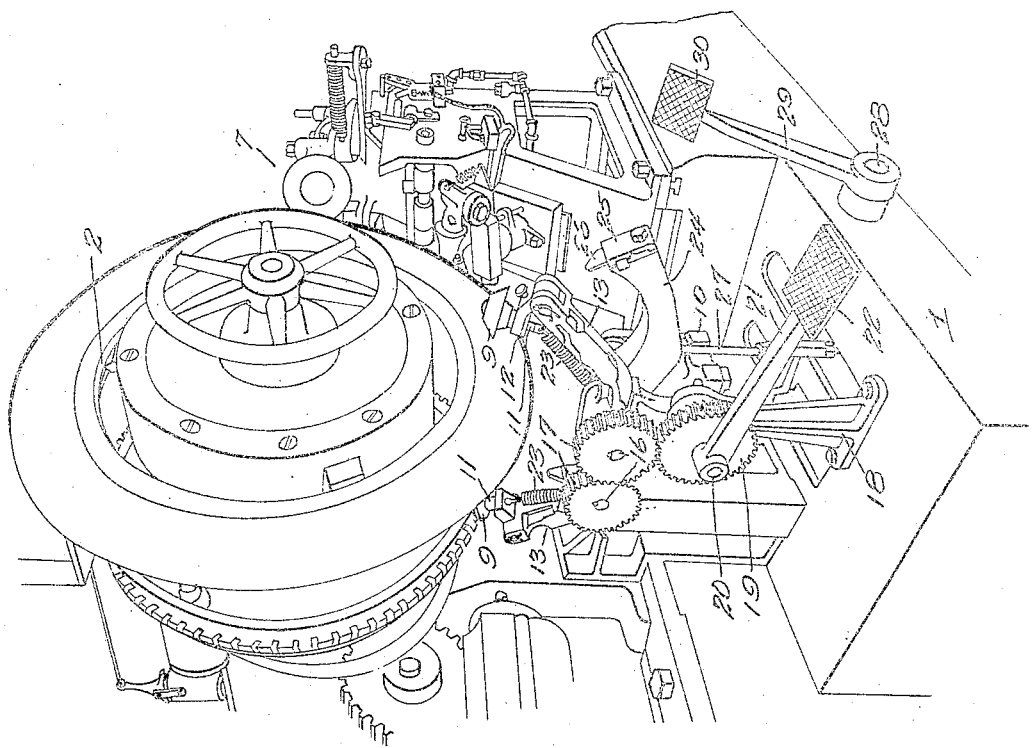
Inventors
Edith Alice Nall executrix of the
estate of Edward Nall deceased
and William B. Harsel.
By Rogers Kennedy Campbell
their Attorneys

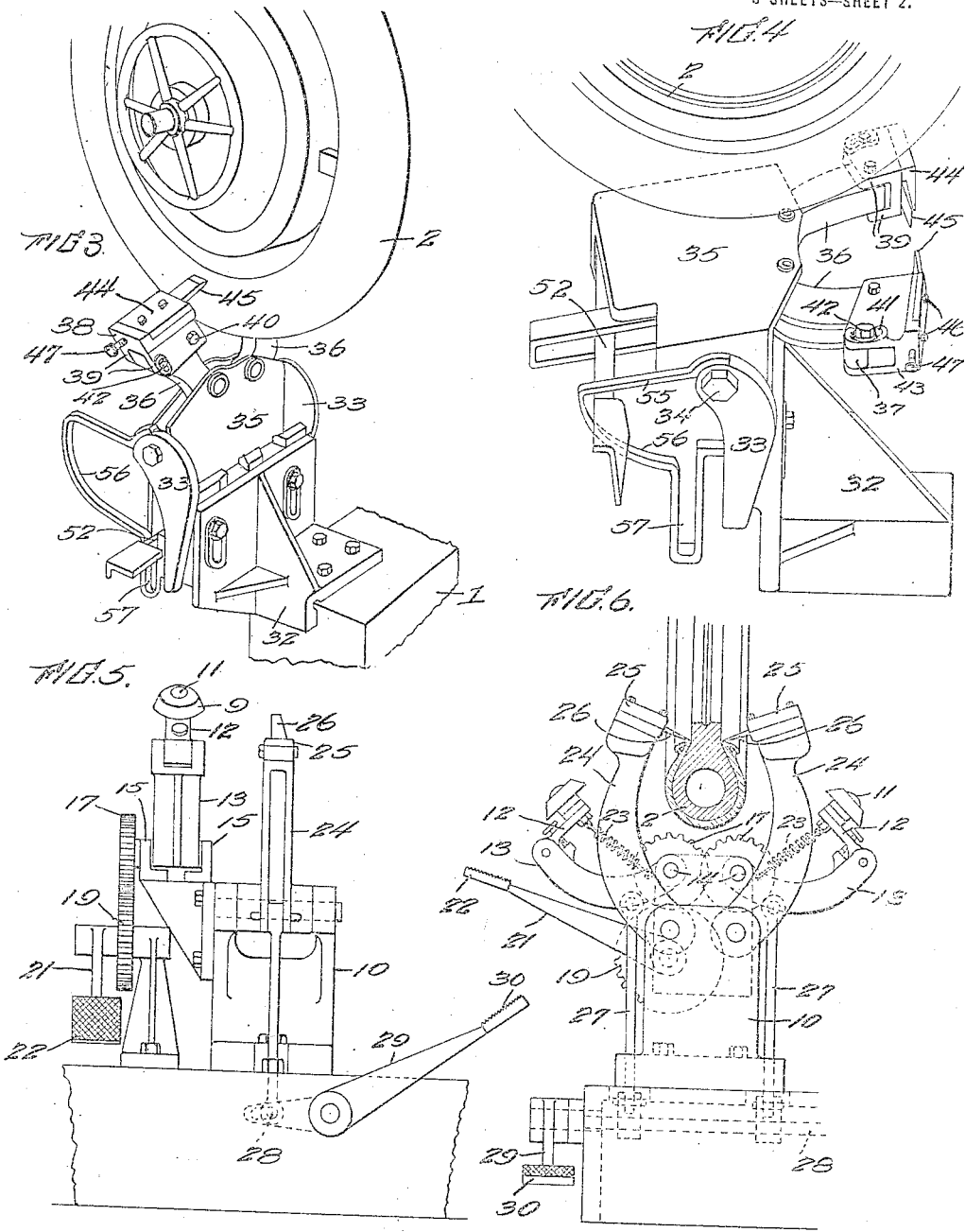

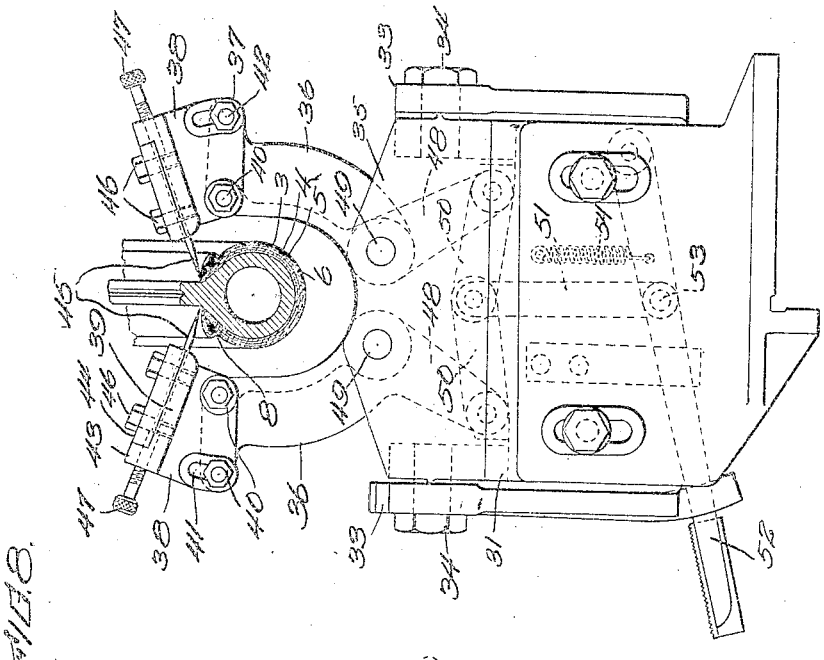
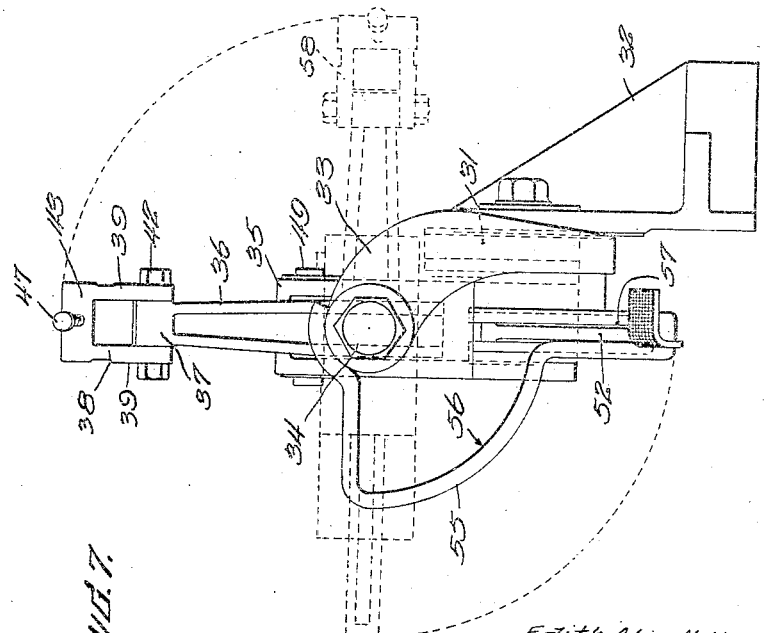

UNITED STATES PATENT OFFICE.

WILLIAM B. HARSEL, OF AKRON, OHIO, AND EDWARD NALL, DECEASED, BY EDITH ALICE NALL, EXECUTRIX, OF AKRON, OHIO, ASSIGNORS TO THE GOODYEAR TIRE & RUBBER COMPANY, OF AKRON, OHIO, A CORPORATION OF OHIO.

TIRE-MAKING MACHINE.

1,395,055.          Specification of Letters Patent.      Patented Oct. 25, 1921.

Original application filed November 3, 1917, Serial No. 200,185. Divided and this application filed September 25, 1918. Serial No. 255,651.

*To all whom it may concern:*

Be it known that the undersigned, WILLIAM B. HARSEL, a citizen of the United States, residing at Akron, in the county of Summit and State of Ohio, and EDWARD NALL, (whose executrix is the undersigned EDITH ALICE NALL, also a citizen of the United States, residing at Akron, in the county of Summit and State of Ohio,) did invent certain new and useful Improvements in Tire-Making Machines, of which the following is a specification, reference being had therein to the accompanying drawings.

This invention relates to tire-building machines; it has more especial reference to carcass-making structures and, in particular, involves certain mechanisms thereof which are operative for and after the so-called "over-bead" operation; and it contemplates the use of certain features which are disclosed in our pending application, filed November 3, 1917, Serial No. 200,185. The present case is a true and legal division of said application. These features are also disclosed in our pending application, filed November 3, 1917. Serial No. 200,186.

The object of the invention is to provide conveniently and accurately operating auxiliary fabric-stitching devices and, in conjunction therewith, fabric-trimming mechanism which is juxtaposed thereto and whereby the edges of the tire-fabric—after being completely laid down, both under and over the beads—may be quickly and accurately trimmed preparatory to the finishing of the carcass.

Another object is to provide means, ag-grouped therewith, for effecting the required positioning of such devices in relation to a revoluble carcass-forming core.

A more specific object of the invention is so to dispose an auxiliary stitcher-device, for use in conjunction with the primary fabric-stitcher devices, that the auxiliary device may be positioned in operating relation to the carcass-forming core as a successive step to the operation of the primary device to smooth down fabric plies on the beads, after which the trimmer-device is positioned to trim surplus fabric beyond the beads.

In the present instance, we have disposed the stitcher and trimmer devices on separate positioning-supports in order that they may be individually and independently actuated into operative position with respect to beads on the fabric-covered core. While we contemplate the mounting of these devices upon a support which is common to the two and whereby they may be actuated by a single operation, yet, in the present case we make no claim thereto since that constitutes the subject-matter of a separate application, filed by us on the 20th day of January, 1919, Serial No. 259,833.

In order that the present invention may be more readily comprehended, we have disclosed one embodiment of the same in the accompanying drawings, though it is to be understood that these drawings are merely illustrative and that the contemplated structure is susceptible of a wide range of variation and modification without departing from the spirit of the invention or sacrificing any of the salient features or underlying principles thereof.

In these drawings:

Figure 1 is a fragmentary view in perspective of so much of a tire-building machine as it is desirable here to show for illustrating our invention;

Fig. 2 is a fragmentary view in vertical transverse section thereof;

Fig. 3 is a view, somewhat similar to Fig. 1, of a modified form of structure;

Fig. 4 is a view, somewhat similar to Fig. 2, of the modification shown in Fig. 3;

Fig. 5 is a detached view in side elevation, on a larger scale, of the auxiliary stitcher-structure located at opposite sides of the core;

Fig. 6 is a view thereof in front elevation, the core appearing in section;

Fig. 7 is a view similar to Fig. 5, of the trimmer-structure; and

Fig. 8 is a view thereof in front elevation.

In these drawings, the reference-character 1 designates, generally, a base or standard which, in the present instance, constitutes a portion of the frame of a tire-building machine, as disclosed particularly in our aforementioned pending application, Serial No. 200,185.

*Carcass-forming core.*—Suitably supported above this base—in the way and operating in the manner explained in said application—is a revoluble core 2 upon which fabric plies 3, 4 and 5 have been disposed—as from an appropriate stock-supplying structure, not here shown, for building a tire-carcass 6. It is to be assumed that the plies 3 and 4 have been laid down on the core by the primary stitcher-devices or fabric-pressing members, designated, generally, by 7; that beads 8 have been positioned thereon; and that the fabric-ply 5 has been laid thereover and partly pressed down on the same, all in the manner and by the apparatus disclosed in said application, or in any other appropriate way.

*Auxiliary stitcher mechanism.*—In addition to the foregoing primary fabric-pressing members 7, we find it advantageous to provide auxiliary fabric-pressing mechanism for operating on the outermost plies of the tire-carcass—those plies which overlie the beads when the latter have been positioned upon the inner plies. While it is possible that this function might also be performed by the pressers 7, if the latter were properly adapted therefor, the present embodiment of our invention, as aforementioned, includes separate ply-rolling members, such as stitcher devices, or bead-disks 9. This auxiliary mechanism is disposed on a pedestal 10 upstanding from the base 1. The stitcher devices are shown as conoidal disks angularly mounted by stems 11 within supporting arms 12. These arms are pivotally arranged at the extremity of the lever members 13 which project upwardly from axles 14. These axles are journaled in bearing members 15 supported immediately below the core, as shown. The axles terminate in shaft-ends 16 upon which are keyed a pair of meshing gears 17. Supported by a bracket 18 and in mesh with one of the gears 17 is a control-gear 19 upon the stub-shaft (20) of which is disposed a lever-arm 21 which terminates in a foot-pedal 22. It will be manifest that depression of the foot-pedal will cause an opposite rotation of the meshing gears 17 in such manner as to swing the supporting arms 12, and, thus, of the stitcher devices into contact with the carcass on the core. When pressure is removed from the foot-pedal, contractile spring 23, secured to the axle-brackets, operate to return the lever-arms to their normal position of spaced relation with respect to the tire-core. The movement of the lever members 13 is so measured with respect to the tire-core that the stitcher devices 9 will first contact with the carcass at the lateral apex of each bead. As pressure on the foot-lever is continued, and as the core is rotated, each disk will move inwardly from the bead-apex to the very toe of the primary stitchers 7 thereon, and to lap over the side and bottom of the endless beads the fabric which has been positioned upon the inner plies of the tire.

*Trimmer mechanism.*—The beads having been overlaid with one or more plies of fabric by the auxiliary stitcher-devices just described, the next step in the manufacture of the carcass is to trim the surplus edge of the fabric along the inner edges of the beads. This operation is necessitated by the fact that the plies are slightly wider than is actually required by the over-all bead-to-bead measurement of the finished carcass, this surplus being along the ties of the tire after the beads and the outermost plies have been put in place. To accomplish this trimming uniformly and expeditiously, we have provided the mechanism now to be described. This (referring to Figs. 1 and 2) includes a pair of arms 24 which have an arc of rotation similar to that of the levers 13. Each of these arms is fitted with an adjustable cap-plate 25 at its outer extremity to support a trimming knife 26. In this instance, means are provided for swinging the pair of arms 24 simultaneously so as to present the trimming knives 26 into contact with the tire-core, the length of the arms and their throw being such that the edges of the knives come into contact with the fabric on the core exactly at the inner bead-line in order to trim off the surplus material of the carcass plies neatly along the bead. This swinging means, in the present instance, includes a pair of vertical reciprocable rods 27 which are suitably connected, as by a link (not shown), the latter being connected to a rock-shaft 28. This shaft projects through the machine base 1 and carries a foot-lever 29 which terminates in a tread-plate 30. These parts are so arranged that a depression of the foot-lever will rock the shaft 28 and thrust the rods 27 upwardly, these carrying with them the knife-arms 24 to which the rods are attached. This operation forces the knives simultaneously into engagement with the fabric of the carcass on the core and, as the latter is rotating, the knives will trim a single annular piece of scrap therefrom.

A modified form of fabric-trimming mechanism is disclosed in Figs. 3, 4, 7 and 8; and therein the trimmer mechanism includes an upright frame-plate 31 provided with an attaching base 32 for securing it to the base 1. The frame-plate 31 supports a pair of arms 33 which are bored in axial alinement for the reception of headed trunnions 34. These trunnions pivotally support between them an oscillatable plate-member 35 which pivotally carries a pair of arcuate trimmer arms 36. Each of these arms terminates in a head 37 over which is adjustably fastened a knife-supporting saddle 38. Each saddle includes a pair of side plates 39 pivotally secured to the head 37 of their trimmer arm 36 by bolts 40. The side plates of the saddle are also provided with arcuate slots 41 for the reception of bolts 42 whereby the saddle may be maintained in any adjusted position upon its pivot bolt 40. Formed integrally with the side plates 39 of each saddle is a clamp member 43 with which there mates a complemental clamp member 44 for a knife blade 45. Fasteners 46 removably secure the clamp members upon the knife, while a thumb-screw 47 extends between the clamp members to form a means for adjusting the knife forwardly as the edge thereof becomes worn. Each trimmer support arm 36 is provided with an arm extension 48 depending below the pivotal point of a support 49 by which the trimmer arms are secured to the oscillatable member 35. The arm extensions are connected by a link-member 50 to a connecting bar 51 having its lower end fastened to a foot-lever 52 pivoted at 53 upon the plate-member 35. Depression of this lever draws the connecting bar downwardly and forces the two trimmer link members outwardly and to the same distance, thus driving the trimming edges of the oppositely-disposed knife-blades simultaneously into corresponding contact with the tire-carcass along the lines of the bead. A contractile coil-spring 54 tends to throw both lever and connecting bar upwardly, thus moving each trimmer arm 36 outwardly from its previous contact with the core when the lever-depressing force is removed. A guide-rail 55 projects from one side of the support-arm 33 and is formed with an arcuate portion 56 radial with respect to the foot-pedal-pivot 53, and of such radius that the foot-pedal 52 is engaged thereby and prevented from moving about its pivot point in the manner described as necessary to bring both trimming knives into contact with the core. The arcuate portion 56 terminates in an elongated bight-portion 57 to afford the foot-pedal sufficient throw for causing the engagement of both trimming knives with the core when the pedal reaches this point along the guide-rail. The weight of the trimmer arms 36 and their companion saddles 38 is such that the supporting plate-member 35 is normally maintained in the horizontal-dotted-line position 58 of Fig. 7, with the arms 36 so separated as to permit them to be moved into a vertical position without striking the outer circumference of the core. Movement of these arms into operative position is accomplished by depressing the foot-pedal from its dotted position in Fig. 7 downwardly around the arc of the guide-rail 56 until the mouth of the bight-portion 57 of this guide-rail is reached, at which time the plate member 35 with its arms, will have been moved into a vertical position with a knife on each side of the core and directed at the bead-line. A further depression of the foot-lever against the action of the coil-spring 54 causes the simultaneous approach of the trimmer arms toward the core and the engagement of each knife with the surplus tire-fabric immediately outside of the beads or toes of the carcass. With the trimming knives in this position, which the operator maintains by keeping his foot on the depressed foot-lever 52, a single revolution of the core results in the complete trimming off of the surplus fabric. The removal, then, of the operator's foot from the foot-lever causes it to be moved upwardly by the spring 54 until the lever clears the point to which this bight runs into the short radius portion, permitting the top-heaviness of the arms 36 to rotate the supporting plate-member 35 downwardly about the pivotal axis provided by the trunnions 34. The arms are thus disengaged from the core while in their vertical position and are returned to normal position in a manner which reduces to a minimum the necessary manual supervision by the operator.

*Operation.*—It is to be understood that the operation of the auxiliary stitcher devices and of the trimming mechanism may be effected simultaneously, or successively, the knife engagement of the trimming mechanism with the core being always successive to the action of the auxiliary stitcher devices; the simultaneous movement of the stitcher and trimmer mechanism, if accomplished at all, being to effect a positioning of both mechanisms ready to perform their respective functions, that of the auxiliary stitchers being essentially first and followed by that of the trimming knives.

From the foregoing, it will be perceived that we have provided an aggroupment of primary stitching devices, auxiliary stitcher devices, and trimmer devices for performing certain operations during the building of a tire-carcass; such operations being under the complete control of the operator and readily accomplished for the expeditious making and completion of the carcass; the desideratum being that wrinkling of the fabric both under and over the beads shall be precluded at all times and the economical use of the fabric being rendered possible so that the wastage of tire-fabric shall be reduced to a minimum.

What we claim is:

1. A tire-making machine including a tire-building core, a support juxtaposed thereto, fabric-manipulating mechanism on the support and positionable in relation to the core, fabric-trimming mechanism juxtaposed to said support and normally disengaged from and occupying a position below the plane of the core, and means for positioning said trimming mechanism into and out of operating position with respect to the core, comprising a pluralitiy of swinging arms movable on axes disposed at approximately right angles to the axis of the core, fabric-cutters carried thereby, toggle-levers connected to said arms, and a foot-operated device connected to said toggle-levers whereby its movement in one direction swings said arms toward and positions the cutters into trimming relation with respect to the core.

2. A tire-making machine including a tire-building core, a support juxtaposed thereto, fabric-manipulating mechanism on the support and positionable in relation to the core, fabric-trimming mechanism juxtaposed to said support and normally disengaged from the core, and means for positioning said trimming mechanism into and out of operating position with respect to the core, comprising a plurality of swinging arms, fabric-cutters carried thereby, levers connected to said arms, and a foot-operated device connected to said levers whereby its movement in one direction swings said arms toward and positions the cutters into trimming relation with respect to the core.

3. A tire-making machine including a tire-building core rotatable on an approximately horizontal axis, a support juxtaposed to and normally disengaged from the core, trimming mechanism on the support, and means operable at the will of the operator for positioning the trimming-mechanism into and out of operating relation with respect to the core and comprising a plurality of swinging members each movable on an axis disposed at an approximately right angle to the axis of the core, fabric-cutters carried by the members, levers connected to the members, and a foot-operated device connected to the levers whereby movement of the device in one direction swings the members toward, and positions the associated cutters into trimming relation with respect to, the core.

4. A tire-making machine including a tire-building core, a support juxtaposed thereto, fabric-manipulating mechanism on the support and positionable in relation to the core, fabric-trimming mechanism juxtaposed to said support and normally disengaged from the core, means for positioning said trimming mechanism into and out of operating position with respect to the core, comprising a plurality of swinging arms, fabric-cutters carried thereby, toggle-levers connected to said arms, a foot-operated device connected to said toggle-levers whereby its movement in one direction swings said arms toward and positions the cutters into trimming relation with respect to the core, and a stitcher device juxtaposed to the core and associated with the trimming mechanism for action on the core in advance of the actuation of the latter.

5. A tire-building machine including a rotatable core, primary stitcher instrumentalities associated therewith, a stitcher device operable independently of the primary stitcher-instrumentalities, a support swingingly associated with the core and on which the said stitcher device is mounted, a second support swingingly associated with the core, and a trimming device mounted thereon and movable therewith in respect to the core.

6. A tire-building machine including a rotatable-core, a primary stitcher-instrumentality associated therewith, a stitcher-device disposed in a plane below the axis of the core, a trimming-device similarly disposed below the axis of the core, swinging supports for the stitcher and trimming devices, and means for actuating the supports in respect to the core.

7. A tire-building machine including a rotatable core, primary stitcher-instrumentalities associated therewith, a support swingingly associated with the core, an arm swingingly associated with the support, a stitcher device on the arm operable successively to the action of the primary stitcher-instrumentalities, a trimming device associated with the core and operable successively to the action of the stitcher device, a swinging support on which the trimming device is mounted and by which it is actuated in respect to the core, and means for actuating said supports in respect to the core.

8. A tire-building machine including a rotatable core, primary stitcher-instrumentalities associated therewith, a support swingingly associated with the core, an arm swingingly associated with the support, a stitcher device on the arm, operable successively to the action of the primary stitcher-instrumentalities, a trimming device associated with the core and operable successively to the action of the stitcher device, a swinging support on which the trimming device is mounted and by which it is actuated in respect to the core, means for actuating said supports in respect to the core, and resilient means for returning the actuated parts to normal position.

9. A tire-building machine including a rotatable core, a pair of swinging members associated with the core at opposite sides thereof, means common to the pair of members for moving them toward and away from each other and thus toward and away from the core, a stitcher device on the support, a trimming device associated therewith, and operable independently thereof and successively to the action of the trimming device and means for maintaining the trimming device inactive while the stitcher device is being positioned in respect to the core.

10. A tire-building machine including a rotatable core, a pair of swinging members associated with the core at opposite sides thereof, means common to the pair of members for moving them toward and away from each other and thus toward and away from the core, a stitcher device on the support, a trimming device associated therewith and operable independently thereof and successively to the action of the trimming device, means for maintaining the trimming device inactive while the stitcher device is being positioned in respect to the core, and means for maintaining the stitcher device inactive while the trimming device is being positioned in respect to the core.

11. A tire-building machine including a support, a stitcher device associated therewith and including supporting-arms, levers pivoted thereto, axles on which the levers are mounted, gearing associated with the levers, a foot-lever for operating the gearing, and trimming mechanism associated with the stitcher-device.

12. A tire-building machine including a rotatable core, a stitcher device associated therewith and including bead-disks movable radially with respect to the axis of the core, disk-supporting arms associated therewith, levers to which the arms are pivoted, gearing associated with the levers for operating the same, a foot-lever for operating the gearing, means for restoring the parts to normal position, and trimming mechanism associated with the stitcher-device for trimming surplus fabric after action thereon by the stitcher-device.

13. A tire-building machine including a rotatable core, primary stitcher-instrumentalities associated therewith, an auxiliary stitcher device operable independently of the primary stitcher-instrumentalities but successively thereto to smooth fabric-plies down on beads on the core and including a pedestal, supporting-arms associated therewith, bead-disks on the arms and movable thereby with respect to the axis of the core, levers on which the arms are pivoted, axles on which the levers are mounted, bearings in the pedestal in which the axles are journaled, gears attached to the axles and intermeshing, a control-gear meshing with said gears, a shaft on which the control-gear is mounted, a foot-lever associated with the shaft for operating the same, a spring associated with the lever for returning it to normal position and thereby effecting a separation of the disks and a movement of the same away from the core, and trimming-mechanism associated therewith.

14. A tire-building machine including a rotatable core, stitcher-mechanism associated therewith, and trimming-mechanism associated with the stitcher-mechanism and operable in succession to the action thereof to trim surplus fabric on the core and including a pair of actuating-arms movable toward and away from each other and in relation to the core, and a foot-lever for actuating the arms.

15. A tire-building machine including a rotatable core, stitcher-mechanism associated therewith, and trimming-mechanism associated with the stitcher mechanism and operable in succession to the action thereof and including a support, swinging arms carried thereby, cutter-devices carried by the arms and adjustable thereon, means for swinging the arms simultaneously to present the cutter-devices in contact with opposite sides of the core, and a foot-operated device associated with the levers for actuating the same.

16. A tire-building machine including a rotatable core, stitcher-mechanism associated therewith, and fabric-trimming mechanism associable therewith and including a base, an oscillatable member associated therewith, trimmer-arms pivoted on the member, a knife supporting saddle on each arm, a clamp-member associated with the saddle, trimming-knives adjustable in the clamp-members, means for moving the knives therein, and means for actuating said oscillatable member to position the trimmer-knives in relation to the core.

17. A tire-building machine including a rotatable core, stitcher-mechanism associated therewith, and fabric-trimming mechanism associable therewith and including a frame-plate, an attaching-base associated therewith, a pair of supporting-arms sustained by the frame-plate, an oscillatable plate-member associated with the arms, a pair of trimmer-arms associated with the plate-member, heads carried by the arms, a knife-supporting saddle on each arm, side-plates forming a part of the saddle and pivotally secured to the head, means for maintaining the saddle at any of a plurality of adjustable positions, clamp-members associated with the side-plates, a trimmer-knife associated with the clamp-member, adjusting means associated therewith for adjusting the knife therein, arm-extensions on the supporting-arms, link-members connected to the extensions, a bar connecting with the link-members, a foot-lever connected to the bar, and resilient means active on the lever for moving it in one direction.

18. A tire-building machine including a rotatable core, stitcher-mechanism associated therewith, and fabric-trimming mechanism associable therewith and including a frame-plate, an attaching-base associated therewith, a pair of supporting-arms sustained by the frame-plate, an oscillatable plate-member associated with the arms, a pair of trimmer-arms associated with the plate-member, heads carried by the arms, a knife-supporting saddle on each of the arms, side-plates forming a part of the saddle and pivotally secured to the head, means for maintaining the saddle at any of a plurality of adjustable positions, clamp-members associated with the side-plates, a trimmer-knife associated with each clamp-member, adjusting means associated therewith for adjusting the knife therein, arm-extensions on the supporting-arms, link-members connected to the extensions, a bar connecting with the link-members, a foot-lever connected to the bar, resilient means active on the lever for moving it in one direction, and a guide-rail associated with the plate-member and acting on the foot-lever to control its movement.

In testimony whereof, we have hereunto affixed our signatures.

WILLIAM B. HARSEL.
EDITH ALICE NALL,

*Executrix of the last will and testament of Edward Nall.*

Witnesses:
E. C. LEADENHAM,
R. D. TROGNER.